Figure 4:
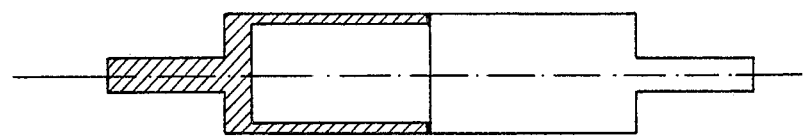

United States Patent [19]

Goof et al.

[11] 4,317,072

[45] Feb. 23, 1982

[54] ELECTRIC MOTOR WITH ROTATIONAL SPEED REGULATION

[76] Inventors: Sven K. L. Goof, Gl. Strandvej 236B, DK-3050 Humlebaek; Jens S. Hansen, Hjortevaenget 501, DK-2980 Kokkedal, both of Denmark

[21] Appl. No.: 100,430

[22] Filed: Dec. 5, 1979

[30] Foreign Application Priority Data

Dec. 7, 1978 [DK] Denmark .................. 5541/78

[51] Int. Cl.³ .................. H02P 6/02
[52] U.S. Cl. .................. 318/138; 318/254; 318/439
[58] Field of Search .................. 318/138, 254, 254 A, 318/439

[56] References Cited

U.S. PATENT DOCUMENTS

| | | | |
|---|---|---|---|
| 3,754,175 | 8/1973 | Girault | 318/138 |
| 3,999,108 | 12/1976 | Tanikoshi | 318/138 |
| 4,127,799 | 11/1978 | Nakamura et al. | 318/254 A |

FOREIGN PATENT DOCUMENTS

| | | |
|---|---|---|
| 1766056 | 7/1970 | Fed. Rep. of Germany . |
| 2152320 | 1/1973 | Fed. Rep. of Germany . |
| 2022300 | 8/1973 | Fed. Rep. of Germany . |
| 2151041 | 11/1973 | Fed. Rep. of Germany . |
| 1379156 | 1/1975 | United Kingdom . |
| 1379196 | 2/1975 | United Kingdom . |
| 1527741 | 10/1978 | United Kingdom . |

*Primary Examiner*—Gene Z. Rubinson
*Assistant Examiner*—John W. Redman
*Attorney, Agent, or Firm*—Fleit & Jacobson

[57] ABSTRACT

Electric motors which are used for instance as driving motors for drilling and cutting implements incorporated in the handle of such implements, are subjected to strongly varying loads. This puts heavy demands to the regulation system of the motor. In a regulation system the signals which are provided by detectors (22) for currently sensing the position of the rotor relative to the stator, are supplied to a pulse generator (44, 46) which provides a pulse frequency being uniquely associated with the period of the varying detector signal. This pulse signal is supplied to a frequency-to-voltage converter (48) which provides an output signal being supplied to a diferential amplifier (50) as one input signal thereof, the other input signal being a reference DC voltage, and the output signal of the amplifier being supplied to a multiplier unit (40, 42) as one input signal thereof, the other input signal being said detector signal. The output signal of the multiplier unit is supplied to the exciting windings (16, 18) of the motor via a power amplifier (54, 56).

7 Claims, 7 Drawing Figures

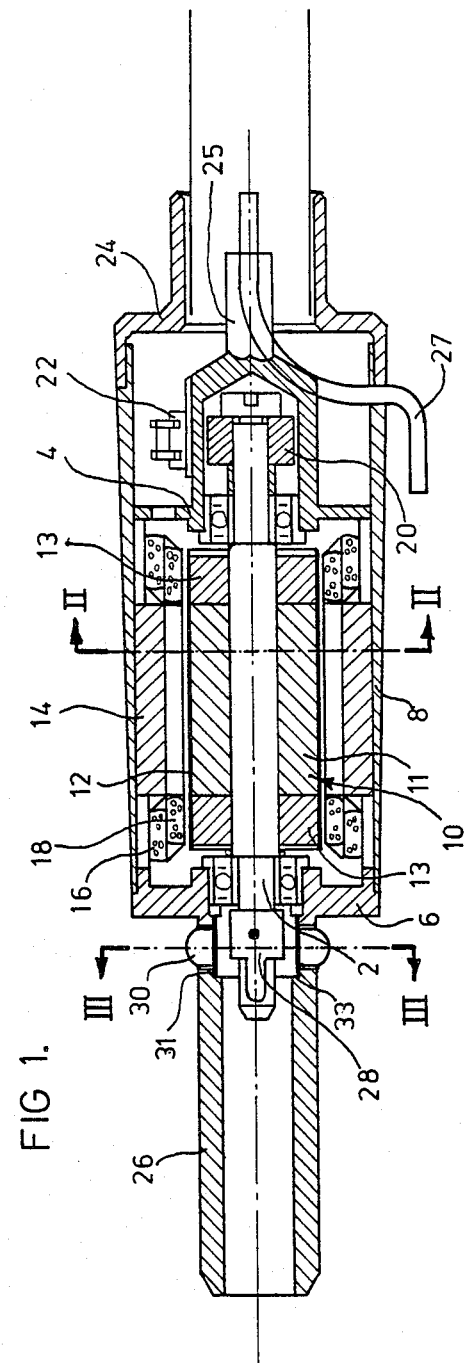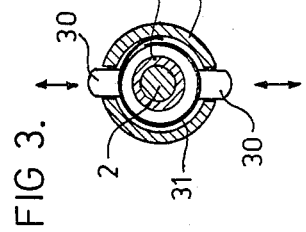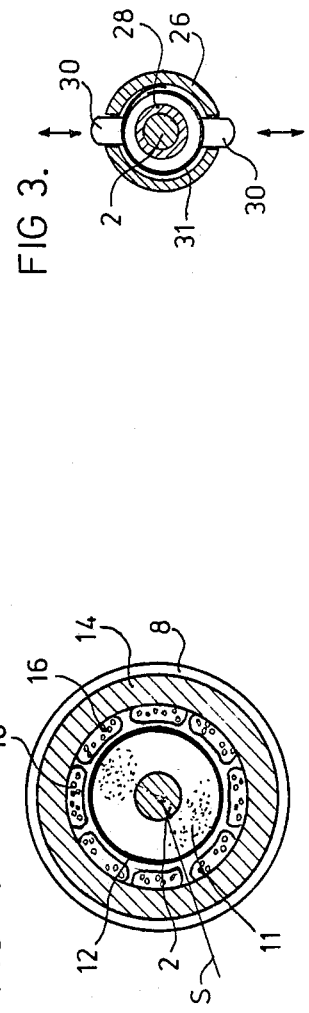

ELECTRIC MOTOR WITH ROTATIONAL SPEED REGULATION

The present invention relates to an electric motor with rotational speed regulation and of the type stated in the opening clause of claim 1.

Within certain areas of the art there is a need of efficient motors of that type having very small dimensions and a relatively high output power. This is for instance the case in connection with driving motors which are to be installable in the handle piece of various implements such as drilling or cutting implements of the type used by dentists, dental mechanics, engravers and also by surgeons. In connection with such employment there is a need of rather high motor power and simultaneously the installation of the motor in the handle of the implements also requires low weight and small dimensions as regards both diameter and length.

These requirements have caused that for drilling or cutting implements of the type mentioned motors have been widely used being arranged outside of the implement handle and being provided with complicated driving mechanisms, e.g. vulnerable cord drives or Bowden cable drives. An essential contributory reason why such drives have been used has also been that previous motors have had a too low efficiency whereby an incorporation of such motors in the handle of an implement has made the handle so hot when the motor operates, that the handle becomes unpleasant to hold in the hand and complicated air or water cooling systems have therefore been necessary.

Conventional direct current motors including carbons or brushes are, moreover, inexpedient due to wear of the carbons or brushes and creation of sparks which can be unfortunate, e.g. during work in operating-rooms, wherein the atmosphere may include combustible vapours, for instance of anaesthetics.

Various so-called brush-less electric motors have therefore been developed for use within the actual area of use, but the spread of such motors in practice has been restrained by too high weight and too large dimensions relative to the motor power provided and moreover by a too low motor efficiency resulting in need of cooling to remove the loss heat.

In brush-less motors of the type contemplated the rotor is made of permanent magnetic material and a detector system is necessary to detect the instantaneous position of the rotor relative to the stator windings and to control the current supply thereto. Several possibilities are known, but previously used electronic control or regulation circuits have not been sufficiently effective.

Driving motors for drilling and cutting implements of the type contemplated are subjected to strongly varying loads making rather big demands to the regulation systems which accordingly have been complicated, cost-demanding and uneconomical in operation in prior art motors.

U.S. Pat. No. 3,999,108 discloses an example of a speed regulation system for electric motors and comprising complicating means including phase shifter means, which is necessary to ensure correspondance as to phase between the rotor position signals and the driving current to the stator windings.

The motor according to the invention is characterized by the features stated in the characterizing clause of claim 1. Thereby is obtained a motor having a simple and effective regulation system by means of which the rotational speed of the motor easily can be stabilized on desired values within a very large range and in spite of rapidly and strongly varying motor loads.

Figure 5:
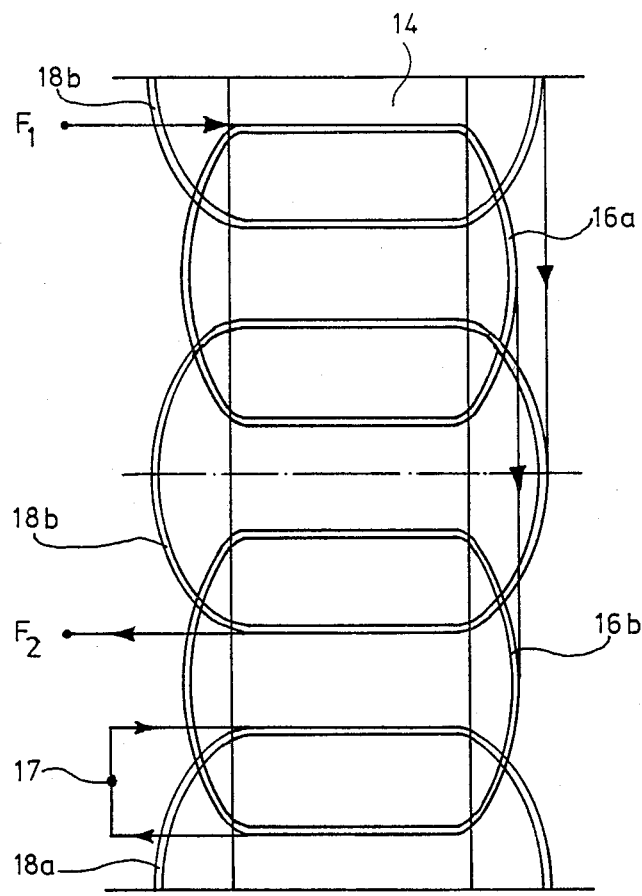
Figure 6:
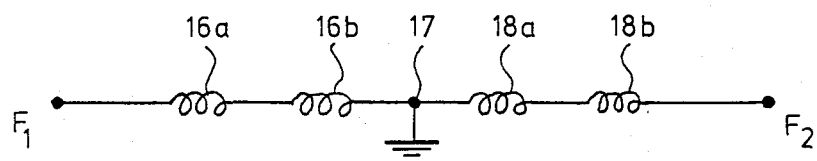
Figure 7:
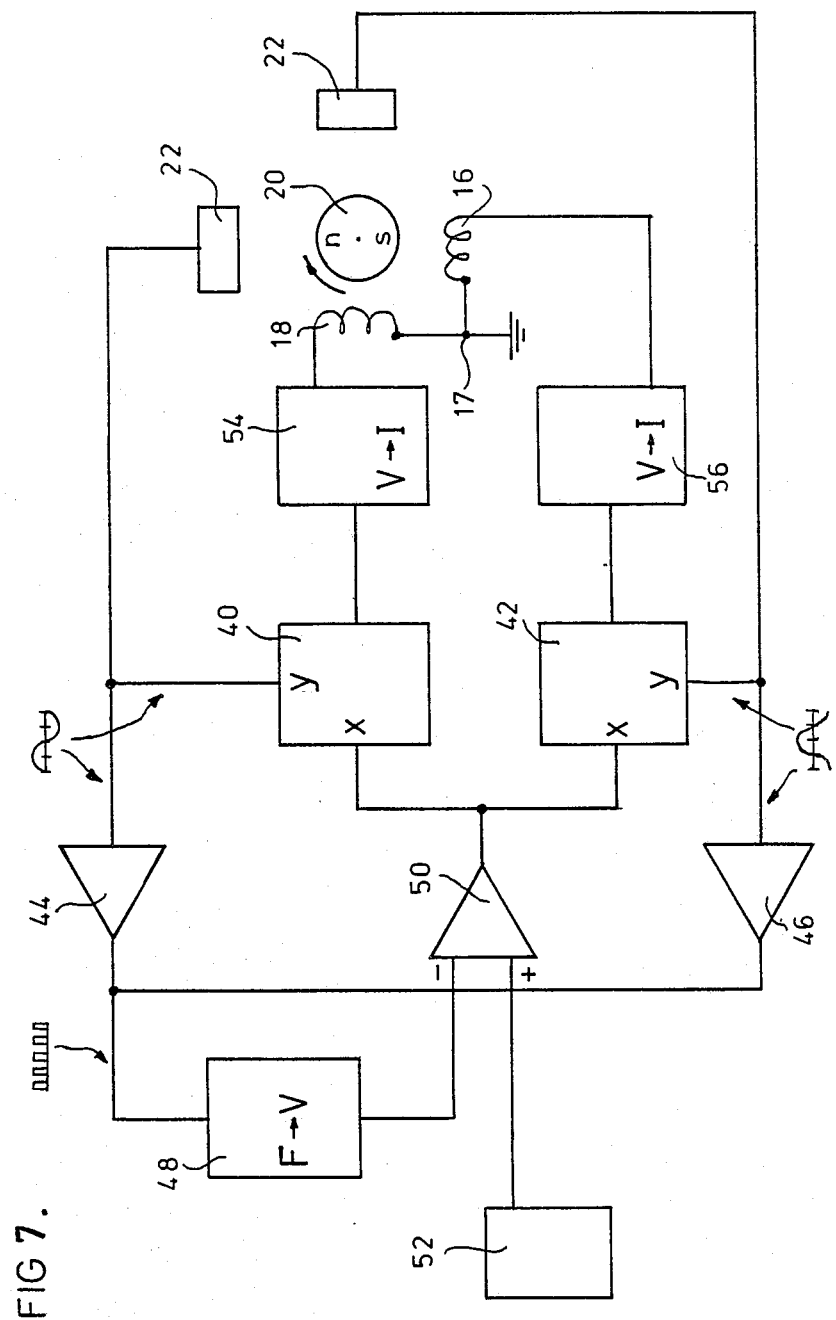

In the following the invention will be explained in further detail reference being made to the drawings, wherein FIG. 1 shows a schematic longitudinal section through a 2-phase embodiment of the motor according to the invention, FIG. 2 shows a section taken along II—II in FIG. 1, FIG. 3 shows a section taken along III—III in FIG. 1, FIG. 4 is a schematic view illustrating an alternative rotor structure, FIG. 5 is a plan view illustrating the arrangement in FIG. 2 developed after an imagined splitting at S in FIG. 2, FIG. 6 is a schematic illustration of the connection in series of the stator windings in a preferred embodiment, and FIG. 7 is a schematic circuit diagram of a two-phase motor according to the invention and the control or regulation equipment thereof.

Reference is now made to FIGS. 1 and 2 of the drawings showing an embodiment of the motor of the invention. A motor shaft 2 is journaled in ball bearings which are mounted in respective transverse walls 4, 6 in a generally cylindrical casing 8 which is also designed as a handle or a part of a handle, e.g. for a drilling or cutting implement.

The ball bearings used can be open bearings which can be spray-lubricated prior to each employment which is expedient, in particular if the implement is a surgical implement which must be capable of being sterilized, whereby a grease lubrication will get lost.

The motor shaft 2 supports a cylindric rotor 10 comprising a permanent magnetic material 11 which preferably is enclosed in a cylindric mantle 12 made of a nonmagnetic material, preferably stainless steel. Such a strengthening mantle is suitable or even necessary in view of the fact that motors according to the invention will be able to operate at rotational speeds of 40,000 rpm or more. The magnetic material 11 may, moreover, be enclosed between two solid rings 13 on shaft 2, e.g. made of an appropriate aluminum alloy and to which the mantle 12 may be attached. These rings 13 are suitable for use in balancing the rotor, since material may be removed as needed by drilling and at appropriate spots on the ring 13, until the rotor 10 has been perfectly balanced, this being necessary in view of the high rotational speeds.

As magnet material preferably a powder-pressed and sintered cobolt-samarium material is used, which is a rather new magnet material which is available from Vacuumschmelze GmbH, Hanau, West Germany, under the registered trade mark "Vacomax". This material has a remarkably high coercivity and also a high saturation, a high energy density and a very pronounced preferred magnetic direction, all being characteristics which make the material particularly suitable for the actual use.

FIG. 4 shows an alternative rotor structure, which is particularly suitable in connection with the small rotor diameters, which occur in connection with the invention. The embodiment shown comprises two preferably identical cup-shaped parts, one thereof being shown in section. Each of these parts carries an axially projecting axle journal and the two parts are joined together for instance by welding along their adjoining edge. The magnetic material is in the space thus defined interior of the rotor and thereby it is not necessary to make an axial bore through the magnetic material, such as in the case of the embodiment of FIGS. 1-3. Such a bore which must be made rather accurate, is particularly difficult to make with small rotor diameters.

As far as one embodiment of both rotor structures is concerned, the magnetic material is made in two halves which are magnetised separately and thereafter are joined together to define a cylindric body (as indicated in FIG. 2).

The casing 8 carries interiorly a stator 14 and exciting or driving windings 16, 18, of which there are two in the two-phase embodiment shown. Usual pole shoes are not necessary, since there is no need of concentrating the magnetic field and thereby space will be available for more copper in the windings.

FIG. 5, which can be considered as a development of FIG. 2 after an axial slitting indicated at S, illustrates how the exciting windings 16, 18 may be arranged completely symmetrical and in series, two coils 16a, 16b and 18a, 18b respectively being used for each phase in the embodiments shown. With such a symmetric arrangement there is obtained the essential effect that the voltages generated will be sinusoidal which opens the possibility of bipolar control. Thereby there is no need of separate means such as phase shifter means to ensure that the driving current to the stator or exciting windings are completely in phase with these windings. Thus, the particular arrangement of stator windings gives occasion for a substantial simplification of the regulation circuit of the motor, which will be further described later on.

As will appear, in particular from FIG. 2, the cylindric rotor 10 used is journaled coaxially within the stator 14, which as the shape of a simple cylinder ring. This gives the possibility of filling out almost the entire space between stator and rotor with a large amount of copper windings. If, moreover, the stator windings are coupled as shown schematically in FIG. 6, i.e. with the junction point 17 between the phase windings coupled to an earth or ground connection, all driving windings and thus the entire amount of copper will continuously be in service during operation, thereby permitting a substantial increase in output power and efficiency of the motor.

After that the exciting windings 16, 18 have been put in their place in the stator, the windings may be compressed and pressed into shape, whereby a.o. the air gap between rotor and windings can be kept very narrow, which also contributes to an increase in the efficiency of the motor.

At the back end of the motor shaft there is mounted rotor position detector means acting to generate signals which represent the instantaneous position of the rotor relative to the stator windings. The detector means may include appropriately arranged pick-up coils, wherein a voltage is generated by a permanent magnet 20, which is fixedly mounted on the motor shaft 2 and which is polarized in the same manner as the rotor magnet 11. However, if such pick-up coils are used it is important that these coils are designed and disposed in such a manner, that they do not occupy space which could be utilized for exciting or stator windings. As just mentioned, it is an important feature that this space, i.e. the entire space between stator and rotor, is filled as much as possible by exciting copper.

However, in the motor of the invention it is preferred to use Hall-generators 22 because, contrary to pick-up coils, such generators will also supply a rotor position signal when the rotor stands still. Moreover, use of pick-up coils necessitates that appropriate phase shifters should be incorporated in the control circuit of the motor, so that there will be a phase difference between the detector signal and the associated driving signal to the stator windings. By using Hall-generators such phase shifters are not necessary and Hall-generators are moreover preferred, since the signal level thereof is substantially constant irrespective of the rotational speed.

Again it is important that the detectors, i.e. the Hall-generators 22, do not occupy space which could be utilized for exciting windings and therefore it is preferred that the permanent magnet 20 and the Hall-generators 22 are arranged on or around one end of the motor shaft 2, e.g. as shown in FIG. 1, wherein the Hall-generators 22 (only one generator being visible) are mounted on a generally tubular extension on the transverse wall 4.

The motor of the invention can be a single-phase motor, but in that case it is preferable to provide means acting to prevent that the rotor can stop in a position, wherein the field at the position of the Hall-generator is zero. A single-phase motor is, however, not sufficiently effective at low rotational speeds and high power and therefore it is preferred that the motor of the invention has at least two phases, i.e. two stator windings and preferably two Hall-generators.

At the back end of the casing 8 there is arranged an end cover 24, which is adapted for introduction of respective and not shown electric supply wires for the detectors 22 as well as for the stator windings 16, 18. This can appropriately take place by having the end cover 24 designed to receive a multiple plug by means of which a multi-conductor cord can be connected to the back end of the implement. Alternatively, the end cover 24 of a part thereof can be designed as a removable unit, which is permanently connected to the multi-conductor cord.

Such a removable unit may carry the necessary plugs for the electric connections to the stator windings 16, 18 and moreover, the Hall-generators 22 may also be mounted permanently and in position on the removable unit and with the electric connections to the Hall-generators made as permanent connections. Thereby, the necessary number of plugs and sockets associated therewith can be substantially reduced and by having the plugs which are still necessary, appropriately placed, these plugs can be used to ensure that the removable end cover unit with Hall-generators only can be inserted in a definite manner, i.e. in that position wherein the Hall-generators 22 are correctly arranged around the longitudinal axis of the rotor.

As indicated in FIG. 1, means may also be provided to connect a tube in the supply cord. By means of a pipe section 27 carried by an appropriate extension on the transverse wall 4 and having a connection end directed rearwardly, e.g. as shown, it is also possible to supply a flow of liquid or air. This flow is conducted to the tool carried and powered by the motor at the front end thereof and in this manner the tool can be cooled and/or lubricated.

The pipe section 27 may extend axially through the motor within the casing 8, but as shown in FIG. 1 the pipe section 27 may also extend out through the casing 8 to define a forwardly directed pipe branch for connection of a tubing or the like (not shown) which conducts the coolant or lubricant to the tool.

The foremost transverse wall 6 carries an attachment branch 26 for mounting a replaceable tool. The corresponding foremost end of the motor shaft 2 which is positioned interior of the attachment branch 26, is moreover provided with one part 28 of a self-catching clutch, such as a claw-clutch. The attachment branch 26 has also at least one locking pin 30 and has preferably two or more such locking pins being arranged and distributed in pairs of diametrically opposed pins. Each of the locking pins 30 is springloaded radially outwards and each locking pin 30 has a rounded-off outer free end, which normally projects from the exterior surface of the attachment branch.

The locking pins 30 are inserted displaceable in respective radially directed guides provided in the wall of the attachment branch 26 and as best shown in FIG. 3, the pins 30 are attached to a band 31 of leaf spring material. This band or strip 31 can be shaped as a ring, but the strip may also have free ends overlapping each other as indicated in FIG. 3, so that the spring leaf strip is able to resiliently yield to a greater extent that a closed ring when the two diametrically opposed locking pins 30 shown simultaneously are forced radially inwards.

The inner side of the attachment branch 26 may appropriately be provided with means to axially retain and support the spring leaf strip 31 without restricting the possibilities of radial movements of the strip. As best shown in FIG. 1 these support means may simply be a circumferential shoulder 33 provided interior of the attachment branch 26 and possibly supplemented by an appropriate locking ring at the opposite side of the strip 31.

With this arrangement a tool (not shown), such as a drill, which is mounted on an axle which is journaled in the interior of a mounting sleeve or socket, can be inserted axially over the attachment branch 26 on the motor or the implement with a sliding fit between the inner surface of the mounting sleeve and the outer surface of the attachment branch. Hereby the locking pins 30 can snappingly engage an appropriately disposed, interior and circumferential groove in the mounting sleeve of the tool, which thereby can be removably retained. Simultaneously, a clutch part corresponding to the clutch part 28, on the end of the tool axle automatically engages the clutch part 28.

Thus, it is possible to mount tools without the necessity of moving the tool or the implement to a particular mutual position, which permits the coupling-up. Moreover, the tool can be removed merely by an axial push exteriorly on the tool sleeve, whereby the locking pins 30 slip out of engagement with the interior groove. This may be performed with one or two fingers of the same hand as that in which the implement is held and thus it is a very simple matter to quickly remove and mount tools as needed.

Reference is now made to FIG. 7, wherein the two Hall-generators 22 and the two exciting windings 16, 18 are shown as arranged in quadrature about the rotor shaft.

When the rotor shaft and thereby the magnet 20 rotate, each of the Hall-generators 22 provides a sinusoidal output signal, which possibly subsequent to an amplification, is supplied to one input (y-input) of respective multiplier units 40, 42. Each sinusoidal signal is, moreover, supplied to the input of a pulse generator 44, 46 respectively, wherein the signals are converted into pulse trains having constant pulse width, but having a pulse frequency which is associated directly with the period of the sinusoidal signal.

It is preferred that each of these pulse generators is of a type which generates a pulse for each zero-crossing of the sinusoidal input signal, i.e. two pulses for each sinus period.

The two pulse signals are combined or interlaced after the pulse generators and this can be performed as a matter of course due to the phase difference, and after this combination the resulting pulse signal includes four pulses per period in the embodiment shown. This pulse signal is supplied to the input of a frequency-to-voltage converter 48 providing an output signal which is relatively constant, yet there will be a certain ripple-voltage, which, however, has been considerably reduced due to the performed combination of the pulse signals which in the embodiment shown will lead to a doubling of the pulse number. If desired, the ripple-voltage may, however, be further reduced or smoothed out by increasing the number of pulses per period in the output signal from each of the pulse-generators 44 and 46.

The output signal of the converter 48, which also is proportional with the frequency and thereby with the instantaneous motor speed, is supplied to one input (the negative input) of a differential amplifier 50, the other input (the positive input) thereof being supplied with a reference voltage from a unit 52, which preferably is adjustable.

The output signal from the amplifier 50, which represents a possible deviation between the instantaneous motor speed and the reference, is supplied to the other input (the x-input) of each of the multiplier units 40, 42.

The multiplier units 40, 42 will thereby be able to correct the sinusoidal signals supplied to the respective y-inputs as needed and the corrected input signals, which still are sinusoidal, are conducted through respective power amplifiers 54 and 56 and then to the associated stator windings 18, 16 respectively.

If the motor load increases the rotational speed will decrease and thereby the period of the sinus signal from the Hall-generators 22 will be longer. This causes in turn that the output voltage from the converter 48 drops correspondingly and thereby a positive difference signal will appear on the output of the amplifier 50. Thereby the sinus signal on the y-input of each of the multipliers 40 and 42 will be multiplied by a factor which is determined by the size of the difference signal and thus there will be an increase in the power supplied to each of the driving windings 16, 18, whereby the motor speed will tend to rise towards the value set by means of the unit 52.

If, on the other hand, the motor load decreases the motor speed will at first rise and thereby the period of the sinus signals will be shorter and the output voltage from the converter 48 rises correspondingly. Therefore there will now be a negative difference signal on the output from the amplifier 50, whereby the sinus signals on the respective y-inputs of the multipliers will be not only multiplied, but also reversed as to signs and therefore a strong braking of the rotor 10 will take place until the difference signal on the output of the amplifier 50 vanishes. Thereby the motor speed is again stabilized on the value set by means of the unit 52.

Preferably, a voltage-to-current conversion takes place in the amplifiers 54 and 56, so that the output signals which are supplied to the stator windings, are a sinus current, this being most appropriate since the sinus voltage applied may deviate from the sinus voltage generated by the rotor and such a deviation will cause losses, i.e. a heating of the apparatus.

All things considered, the drive or power unit (FIG. 1) can operate with a very high efficiency of more than 90% and the heating of the handle of the implement will consequently not be inconvenient during use of the implement and a separate cooling thereof is not necessary. The power unit itself can, moreover, be made with a weight which is substantially less (about 60 grams) than that of corresponding prior art units (about 100 grams) and with a diameter of about 10 mm. The axial length of the unit may moreover be small and thereby the unit will be very convenient to use as an implement handle piece which without difficulties may be manipulated and held with a pencil grip thereof.

In spite of the small dimensions of the power unit the motor according to the invention is able to produce a driving force which is substantially higher than that of prior art motors being of the same type and having substantially larger overall dimensions and weight.

The regulation system of the motor according to the invention can be incorporated in a very compact and possibly transportable unit, which is connected to the motor unit through an appropriate multicore cable as mentioned above.

While the motor of the invention has been described above in connection with a particular field of use it is obvious that the motor also may be used in cases wherein small overall dimensions for the motor unit itself are not decisive.

We claim:

1. An electric motor having rotational speed regulation and comprising a rotatably journaled cylindrical rotor (10) including a permanent magnetic material (11); a stator (14) having at least one exciting or driving winding (16, 18); rotor position detecting means; and a control and regulating circuit, said rotor position detecting means comprising at least one sensor or transducer unit (22) generating an output signal which varies synchroniously with the instantaneous position of said rotor, said output signal being supplied, to a two input multiplier unit (40 or 42) as one input signal (y) thereof, said multiplier unit multiplying the signal with a factor determined by the other input signal (x) of said unit, whereafter said multiplied signal is supplied to said exciting winding through a power amplifier (54 or 56), CHARACTERIZED in that said sensor or transducer signal also is supplied to a pulse generator (44 or 46), generating a pulse output signal having a pulse repetition rate which is uniquely associated with and directly determined by the period of said varying sensor or transducer signal, and in that said pulse signal is supplied to a frequency-to-voltage converter unit (48) which provides an output signal being supplied to a differential amplifier (50) as one input signal thereof, the other input signal being a reference voltage, and the output signal of said amplifier being supplied to said multiplier unit as said other input signal (x) thereof.

2. The motor of claim 1, wherein said input signal is supplied to said multiplier unit subsequent to an amplification thereof.

3. The motor of claim 1, wherein said other input signal is an adjustable reference voltage.

4. The motor of claim 1, wherein each sensor or transducer unit is a Hall-generator (22) providing a sinusoidal rotor position signal, CHARACTERIZED in that each pulse generator (44, 46) provides an output pulse at each zero-crossing in the sinusoidal rotor position signal applied thereto.

5. The motor of claim 1 or 4, wherein said stator (14) has two or more phase-shifted driving windings (16, 18), and wherein said rotor position detecting means comprise a sensor or transducer unit (22) for each driving winding and arranged with substantially the same mutual phase, CHARACTERIZED in that each rotor position signal is supplied to separate pulse generators (44, 46 respectively), the pulse output signals thereof being combined into one single signal which is said input signal for said converter unit (48).

6. The motor of claim 5, CHARACTERIZED in that said driving windings are arranged symmetrically and in series.

7. The motor of claim 6, CHARACTERIZED in that the junction point (17) between said two driving windings is connected to a zero-potential.

* * * * *